United States Patent [19]

Kresky et al.

[11] 4,438,974

[45] Mar. 27, 1984

[54] GUIDE PROFILE FOR INERTIA LATCH

[75] Inventors: Fred C. Kresky, Richland, Mich.; Daniel R. Boyer, Gainesville, Fla.

[73] Assignee: Keiper U.S.A., Inc., Battle Creek, Mich.

[21] Appl. No.: 305,187

[22] Filed: Sep. 24, 1981

[51] Int. Cl.³ .................... A47C 1/025; B60N 1/04
[52] U.S. Cl. .................................. 297/379; 297/216
[58] Field of Search ........................... 297/379, 216

[56] References Cited

U.S. PATENT DOCUMENTS

| 4,147,386 | 4/1979 | Stolper | 297/379 X |
| 4,165,128 | 8/1979 | Strowick et al. | 297/379 X |
| 4,223,946 | 9/1980 | Kluting | 297/379 X |
| 4,318,569 | 3/1982 | Bilenchi et al. | 297/379 |

Primary Examiner—William E. Lyddane

[57] ABSTRACT

Improved inertia latch passenger car seat back hinge extending operative range of nose down vehicle parked condition without incurring seat back lock up.

7 Claims, 3 Drawing Figures

GUIDE PROFILE FOR INERTIA LATCH

BACKGROUND OF THE INVENTION

Prior art inertia latches in passenger car seat back hinges employ an inertia element which blocks forward tilting of the seat back under emergency vehicle deceleration while accommodating forward tilting of the seat back for rear seat passenger ingress and egress without the necessity for actuating a manual release lever. The inertia element employed in such system is responsive to gravity as the seat back moves forward to move the latch to a release position and is responsive to inertia deceleration forces to retain and increase its latching attitude upon sudden deceleration. This is accomplished by locating the center of gravity of the inertia element with a horizontal displacement relative to a pivotal mounting on the seat back providing a gravity actuated bias in an unlatching direction, and with a vertical displacement providing a latching bias responsive to inertia incident to vehicle deceleration. With the seat back in normal user position such inertia element is cammed to a latching attitude overcoming gravity unlatching bias. Upon downward inclination of the vehicle when parked on a hill the inertia elements center of gravity shifts relative to its pivot in a direction decreasing the effective moment arm for gravity unlatching actuation. When parked on a hill with substantial downward inclination, e. g. over 13°, the effective moment arm for gravity release in such prior art constructions failed to dependably accommodate forward seat tilting without actuation of a manual release lever.

Specifications for inertia latches, under both commercial and governmental FMVS standards, include not only an acceptable range of deceleration values which will retain the latching attitude of the inertia element to block forward seat back tilting but also a requirement for dependable latch release under gravity actuation with the vehicle parked nose down at 15° and the seat back adjusted to a standard position. Accordingly, various means were sought to extend the operative nose down parking range without impairing the operation of the inertia latch in effectively locking under such commercial and government specifications.

SUMMARY OF THE INVENTION

Applicants have discovered that a contributing factor rendering the prior art inertia latch unnecessarily prone to nose down parking lockup consisted in reduceable clearance between a forward lobe on the inertia latch pivotally mounted on a seat back and an adjacent surface of the cooperating latch element for arresting forward seat back tilting. Such clearance provided a possibility under nose down parking for the inertia element to come to rest with all clearance taken up in a latching direction and with the center of gravity's horizontal leverage insufficient to overcome frictional drag at the pivot so as to take up clearance in a latch opening direction.

Applicants have further discovered that by minimizing the clearance between the forward lobe of the inertia element and the adjacent surface of the latch element with the seat back in standard position several degrees improvement in dependable nose down seat back release operation could be attained. Thus, while prior units were limited to a 13° nose down parked condition for dependable latch release, the addition of a guide profile minimizing forward lobe clearance resulted in a 17° dependably operative angle, thereby move than meeting the government 15° specification.

Collateral benefits from reduced clearance include minimized dynamic effects from impacting and rebound of the inertia element—for example, under rapid seat back return to a limit stop in its upright position—as well as attenuation of latch chatter incident to vehicle vibration as under rough road conditions.

DETAILED DESCRIPTION OF THE DRAWINGS

Figure 1:
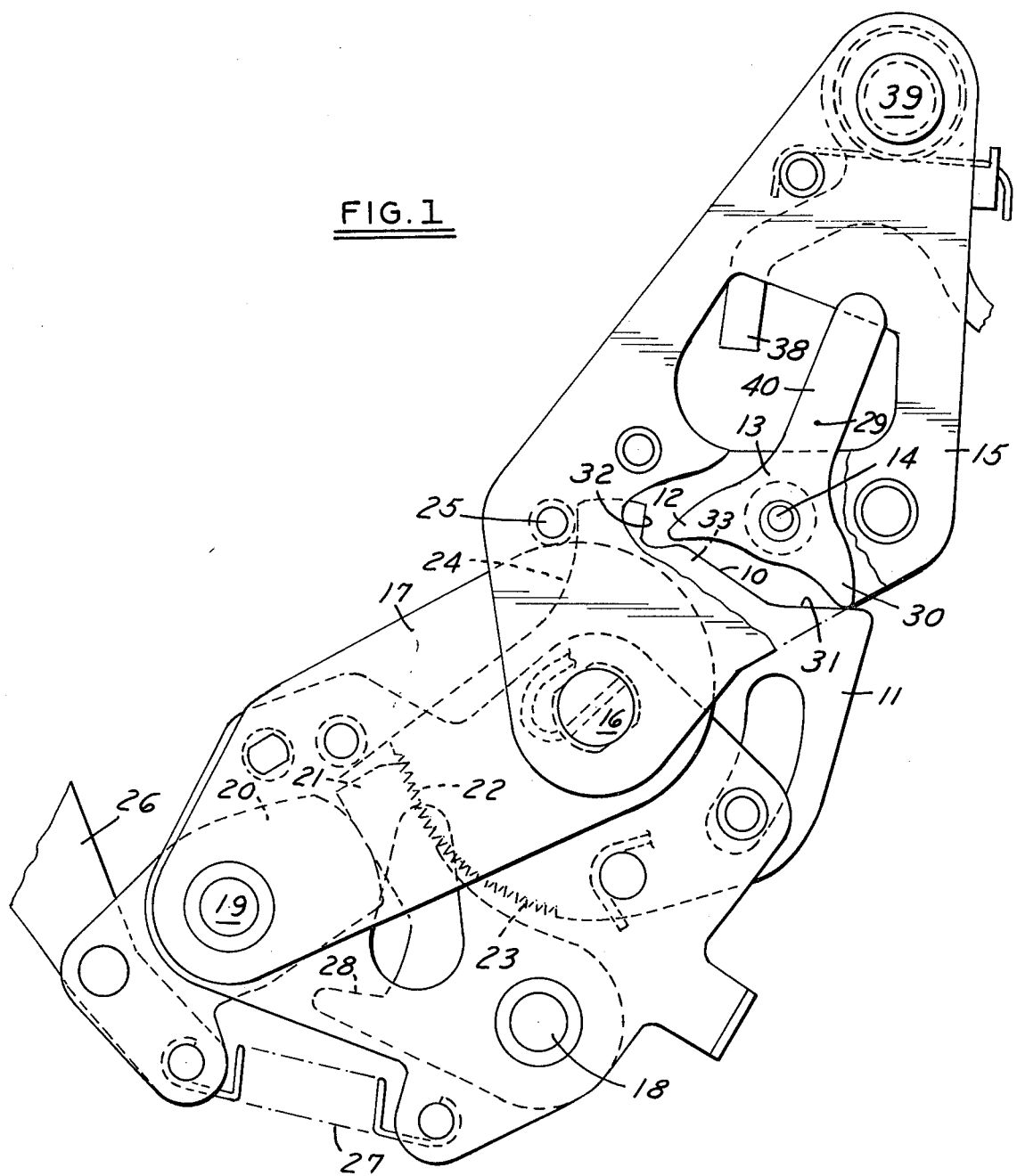
FIG. 1 is a side elevation of an inertia latch adjustable seat hinge incorporating the present invention.

With reference to FIG. 1 the seat hinge of the present invention includes components of a prior art hinge to which the improvement of the present invention, guide profile 10, has been added on intermediate quadrant plate 11 for engagement by forward lobe 12 of inertia latch element 13 pivotally mounted at 14 on seat back bracket 15 which is pivotally mounted at 16 together with quadrant plate 11 to lower seat bracket 17 having seat mounting holes 18 and 19, the latter serving as pivot center for cam 20 engageable with pawl 21 pivotally mounted on hole center 18 and having pawl teeth 22 engageable with matching quadrant teeth 23 to control adjustable position of quadrant plate 11 having stop surface 24 engageable by stop pin 25 on upper seat bracket 15 to establish user position of the seat back. Adjustment of the seat is effected through release of cam 20 by handle 26 against tension of spring 27 with positive drive out of pawl 21 and teeth 22, 23 through engagement of pawl projection 28.

Referring now specifically to the operation of the inertia latch, center of gravity 29 of inertia element 13 has a horizontal displacement relative to pivot 14 providing gravity bias for clockwise rotation overcome by engagement of lobe 30 with cam surface 31 upon return to user position of seat back bracket 15 limited by engagement of stop surface 24 by stop pin 25.

Center of gravity 29 also has a vertical displacement from pivot 14 providing a counterclockwise moment for inertia element 13 responsive to vehicle deceleration serving under predetermined values of vehicle deceleration to balance the clockwise gravity moment and retain lobe 12 of inertia element 13 in an engagement attitude relative to stop surface 32 on quadrant plate 11. High deceleration values will overbalance the gravity moment causing inertia element 13 to shift from contact between lobe 30 and surface 31 to forward contact between lobe 12 and surface 10 with further counterclockwise pivotal movement of inertia element 13 as lobe 12 rides on the profile surface into the lower corner of stop face 32 upon any initial forward tilting of the seat back incident to deceleration or rear passenger impact on the seat back.

Prior to provision of guide profile 10 quadrant plate 11 was constructed with a direct straight surface indicated by broken line 33 extending between the base of stop surface 32 and cam surface 31 which included substantial normal clearance relative to forward lobe 12 of inertia element 13. With the vehicle parked nose down on a steep grade such as 15° the center of gravity 29 would have its horizontal displacement from pivot 14 reduced by 15° counterclockwise shift in angularity. This would still normally leave sufficient horizontal c.g. displacement to actuate inertia element 13 in a clockwise unlatching direction upon forward tilting of the seat back as long as the lobe 30 remained in engagement with cam surface 31 at the inception of forward seat back tilting. However, with nose down parked conditions in excess of 13° the possibility existed that unusual forces, such as counterclockwise inertia imparted to inertia element 13 upon return of the seat back to user position causing lobe 30 ride up cam surface 31 and/or rebound from sudden engagement of pin 25 with stop surface 24, might cause inertia element 13 to shift in counterclockwise direction to engagement of lobe 12 with surface 33 in which position the further reduction in clockwise angularity of center of gravity 29 relative to pivot 14 could be sufficient that any remaining horizontal displacement might not overcome static friction at pivot 14 so that inertia element 13 might remain shifted forward in a counterclockwise direction with lobe 12 resting against surface 33. Under such condition, especially with the increased clockwise movement required for lobe 12 to clear stop 32 in order to permit free forward seat back tilting, a lockup could result at nose down parked angles exceeding 13° even though release would occur whenever the inertia element 13 came to rest with lobe 30 engaging cam surface 31.

Applicants discovered that by adding guide profile 10 to reduce and minimize the lost motion clearance relative to lobe 12 and lobe 30 the maximum nose down parking angle for dependable automatic latch release was increased from 13° to 17° thereby exceeding company and government FMVS Standard No. 209 requirements for automatic release at a 15° downhill attitude.

Figure 2:
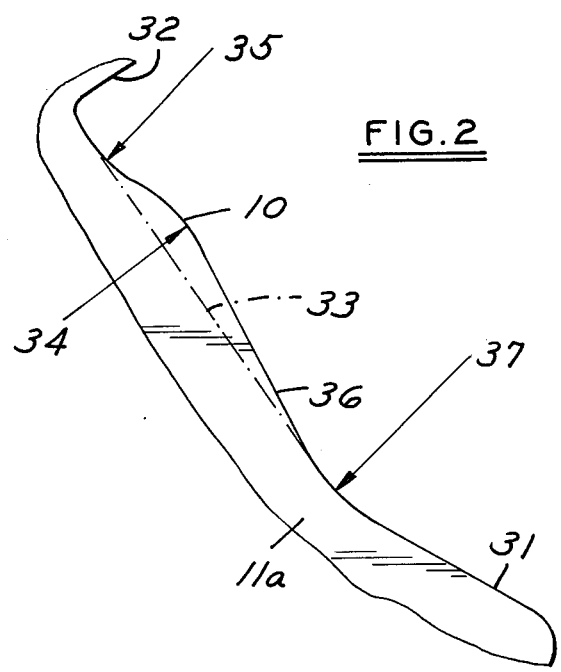
FIG. 2 is an enlarged fragmentary view showing a detailed layout of the latch guide profile improvement for the inertia latch.

With reference to FIG. 2 a preferred guide profile includes a circular arcuate crest 34, dimensioned for minimum clearance under lobe 12 with the seat back in normal user position, blending with reverse radius arc 35 leading to the lower corner of stop surface 32 and with straight line 36 which in turn blends with circular arc 37 which likewise blends with cam surface 31.

Figure 3:
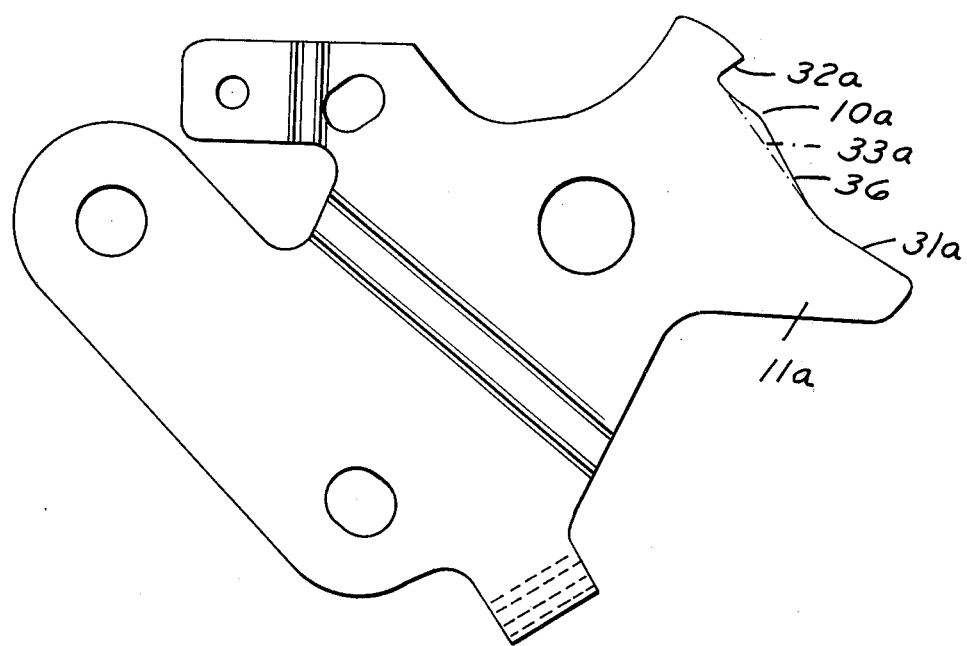
FIG. 3 is a side elevation of a support for a front seat back latch similar to that illustrated in FIG. 1 without provision for adjustment in user seat back position.

With reference to FIG. 3 illustrating a front seat back latch similar to that of FIG. 1 without provision for adjustment in user seat back position, like numbers with subscript "a" have been applied to like elements of the guide profile latch.

With minimized clearance, lost motion leading to surface impact of lobes 12 and 30 with adjacent surfaces of quadrant plate 11 as well as clatter from inertia element 13 vibration have been substantially reduced and virtually eliminated under normal driving conditions.

To accommodate malfunction or even more extreme nose down parking, an emergency manual release lever 38 pivoted at 39 can actuate extension 40 in a clockwise release direction.

In the claims the expression "means to minimize any pivotal lost motion" is intended to mean decrease to the least possible degree rather than merely to limit.

We claim:

1. Passenger car seat back hinge comprising pivotally connected brackets for respective connections to seat and seat back, inertia latch means for arresting forward seat back tilting under predetermined emergency vehicle deceleration, said latch means including a gravity-/inertia actuated latch element pivotally mounted on said seat back bracket for movement between latching and unlatching positions, a cooperating latch stop mounted on said seat bracket engageable by said latch element, said latch element having a center of gravity horizontally displaced from its pivotal center when the car is on a level surface to produce a gravity actuated unlatching moment and vertically displaced to produce a vehicle deceleration inertia actuated latching moment, positive stop means limiting backward pivotal movement of said seat back bracket to a user position, cam means responsive to return of said seat back to user position for overcoming gravity bias of said latch element and producing pivotal movement to a latch engaging attitude, said latch element having substantial additional pivotal travel available in a latch engaging direction to produce full latch engagement in response to initial seat back forward tilting under emergency deceleration conditions, and means to minimize any pivotal lost motion angular clearance for said latch element with said seat back bracket in user position, said horizontal displacement and unlatching moment being reduced upon parking on a downward slope in proportion to the steepness of slope and being subject to further reduction by any pivotal lost motion displacement of said latch element, as might result from applying the brakes in parking on a downward slope, thereby resulting in an ineffective release moment when the combination of downward steepness of slope and lost motion exceed predetermined limits, said means to minimize any pivotal lost motion angular clearance combined with said horizontal displacement accommodating at least a 15° downward parking angle without loss of effective release moment.

2. Seat back hinge as set forth in claim 1 wherein said means to minimize pivotal lost motion ncludes guide profile means extending between said latch stop and said cam means.

3. Seat back hinge as set forth in claim 1 wherein said latch element includes horizontally spaced lobes for respectively engaging said latch stop element and said cam means, and wherein said means to minimize pivotal lost motion includes lobe engageable guide profile means extending between said latch stop and said cam means.

4. Seat back hinge as set forth in claim 3 wherein said guide profile means includes a rise immediately adjacent to said latch stop engaging lobe having minimal clearance when said other lobe engages said cam means in user position of said hinge.

5. Seat back hinge means as set forth in claim 4 including blended arcs from said rise to other portions of said guide profile means.

6. Seat back hinge as set forth in any of claims 1–5 wherein said latch stop is formed as part of adjustable plate means interposed between said seat and seat back brackets and means for adjusting the operative angular position of said plate and user position of said seat back bracket relative to said seat bracket.

7. Seat back hinge as set forth in claim 1 wherein said inertia latch element comprises a double lobe centrally pivoted element with an upward extension including a center of gravity spaced rearwardly and upwardly of the pivot center, one of said lobes extending forwardly to engage said latch stop, the other of said lobes extending rearwardly to engage said cam means, said latch stop being connected to said cam means by a guide profile having a rise adjacent said forwardly extending lobe minimizing pivotal lost motion of said latch element when said rearwardly extending lobe is adjacent said cam means with said seat back bracket in user position.

* * * * *